Jan. 2, 1951     G. C. HUGHES     2,536,370
FLUID PRESSURE SEAL
Filed May 2, 1949
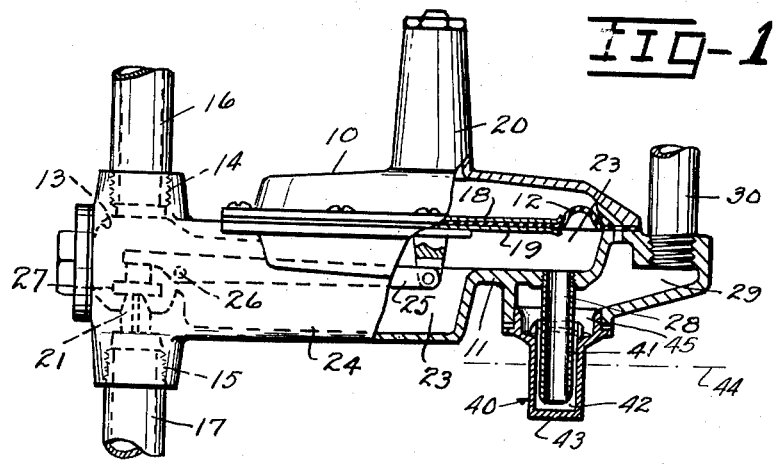
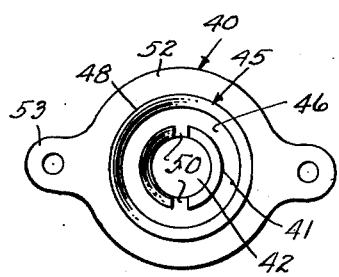
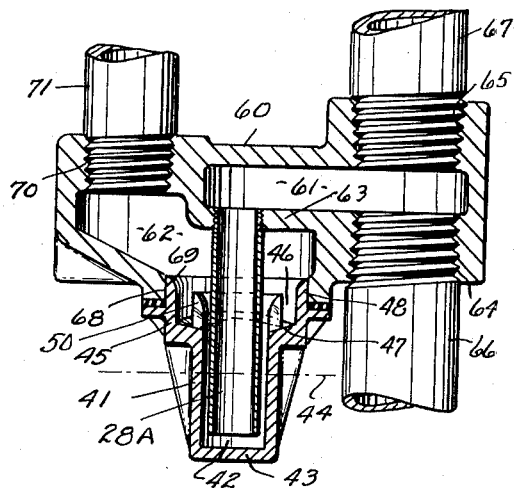
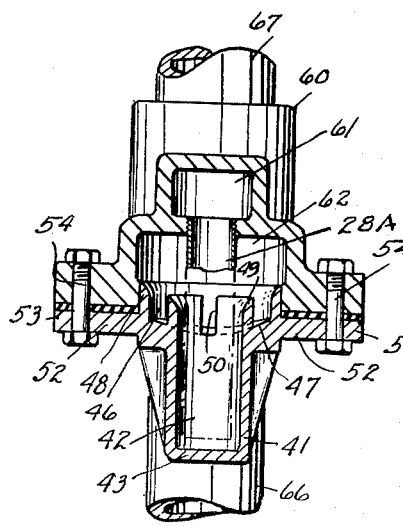
INVENTOR.
GEORGE C. HUGHES
BY
Bates, Teare, & McLean
ATTORNEYS Patented Jan. 2, 1951

2,536,370

UNITED STATES PATENT OFFICE 2,536,370

FLUID PRESSURE SEAL

George C. Hughes, Anderson, Ind., assignor to Reynolds Gas Regulator Company, Anderson, Ind., a corporation of Indiana Application May 2, 1949, Serial No. 90,828

1 Claim. (Cl. 137—53)

This invention relates to an improved fluid seal for use in connection with gas pressure lines, pressure regulators and the like, and more specifically to an improved mercury seal for preventing hazards due to inadvertent high gas pressures.

The invention is especially adapted for use in distribution systems where gas is forced through supply mains under high pressure, which pressure is reduced by regulating valves for consumption in heating devices and the like. Present day pressure regulating valves are highly efficient. However, due to the hazards inherent in gases, it is essential that the highest degree of protection possible be used. Occasionally, a particle of scale or rust may become dislodged from the supply main and be gripped between a closing pressure regulator valve and its seat, thus preventing complete closure of the valve. Under such conditions the pressure in the line serviced by the regulator will increase gradually until it equals that of the pressure in the supply main, thus creating a hazardous condition at the point of consumption.

In the past fluid seals have been used to overcome the hazards due to inadvertent high pressure conditions. Generally such seals have included a receptacle or container for a relatively heavy liquid, particularly mercury. A tube having one end in communication with the pressure line to be protected was positioned with its other end submerged in the mercury. Thus when the pressure of the gas was sufficient to overcome the weight of the mercury the excess pressure exhausted through the mercury. Suitable enclosures and conduits were provided to collect the exhausting gas and convey it to an area when the hazard was at a minimum. This exhausting of the gas was often but of a momentary duration as it was interrupted by a sudden demand for an increased supply of gas to the service line which opened the regulator valve and dislodged the particle so that the valve thereafter closed tightly.

In seals used in the past a momentary increase of pressure and consequent momentary exhausting of gas decreased the amount of mercury in the seal receptacle, following which the seal did not maintain gas in the service line at its original pressure setting. Each repeated momentary increase in pressure further depleted the amount of mercury in the seal until the seal permitted a continuous escape of gas even at extremely low and insufficient service pressures.

The present invention contemplates the provision of an improved fluid pressure seal of the type above mentioned, which will overcome the disadvantages of prior fluid seals, which will require a minimum amount of mercury, and which will be so arranged that mercury ejected from the seal by the escaping gas will be returned to the seal.

A further object of the present invention is to provide an improved mercury pressure seal for gas lines and the like which will permit repeated discharges of gas through the sealing fluid without materially reducing the pressure sustaining qualities of the seal.

Other objects and advantages of this invention will become more apparent from the following specification, reference being had to preferred embodiments of the invention illustrated in the accompanying drawings. The essential features of the invention will be summarized in the claim.

In the drawings, Fig. 1 illustrates a fluid pressure regulator having the improved pressure seal incorporated therein, certain portions being broken away to more clearly illustrate the internal construction; Fig. 2 is a vertical section through the seal as used in a service line apart from the regulator; Fig. 3 is a vertical section as indicated by the lines 3—3 in Fig. 2; and Fig. 4 is a plan view of the seal receptacle itself.

In Fig. 1 of the drawings the improved safety seal is illustrated in connection with a fluid pressure regulator of the type ordinarily used to control the pressures of gas for use in household appliances and the like. Such regulator may comprise an upper casing 10 and a lower casing 11 between which a flexible diaphragm 12 is clamped. The lower casing 11 extends beyond the upper casing member 10 (to the left in Fig. 1) to provide a valve chamber 13 having an inlet port 15 and an outlet port 14. A pressure line or inlet conduit 17 is connected with the inlet port, while a service line or outlet conduit 16 is connected with the outlet port. The diaphragm 12 is clamped between a pair of weighted disc-like members 18 and 19, and is loaded by a suitable spring not shown but which is mounted in a vertical extension 20 of the upper casing in the usual manner.

The inlet port 15 is provided with a valve seat 21, and is open and closed under control of the pressure within the chamber 23 formed between the lower casing 10 and the diaphragm 12. As indicated in Fig. 1, the diaphragm disc 19 has a downwardly projecting extension which is pivotally connected with one end of a valve lever 25 which, in turn, is pivoted to the casing 11 as at 26. This lever projects into the valve chamber 23 and carries a valve member 27 which coacts with the valve seat 21 to regulate the flow of fluid between the pressure line 17 and the service line 16.

The normal functioning of the regulator is such that when the desired pressure is built up in the chamber 23 beneath the diaphragm 12, the diaphragm will move upward against its loading spring causing the valve member 27 to engage the seat 21. This arrangement is more or less general and, so far as the present invention is concerned, is merely an illustration of one type of fluid pressure regulator with which this invention is particularly well adapted to be used.

It will be seen that should a foreign particle, such as rust, dirt, or the like, lodge between the valve seat 21 and the valve member 27, gas would seep from the pressure line 16 into the regulator and the gas pressure in the chamber 23 and the outlet line 16 would be built up until it was equal to the pressure in the pressure line 17. This pressure is often too great to support flame at the burners of appliances. Accordingly, it may extinguish the flame of pilot lights so that when the appliance valve is opened, the room in which the appliance is located, might be filled with gas. To prevent this dangerous condition, a safety seal may be mounted on the regulator. When the pressure in the chamber 23 reaches a predetermined maximum, this seal permits sufficient gas to be vented from the regulator as will maintain the pressure in the service lines 17 below the desired maximum pressure.

As shown in Fig. 1, the casing 10 is provided with a downwardly extending tube 28. This tube extends into a pool of mercury in fluid seal member or receptacle 40 which normally prevents the escape of gas therethrough. When, however, the pressure in the chamber 23 rises above the predetermined maximum, the gas will force the mercury out of the tube and gas will escape into a chamber 29 formed in the casing 11, which chamber is connected by an exhaust conduit 30 to the exterior of the building within which the unit is mounted.

The present invention is particularly concerned with improvements in the safety seal 40 which carries the mercury to seal the end of the vent tube 28 and which, in response to an abnormally high pressure in the chamber 23, vents gas from the regulator, thus maintaining the gas pressure in the service line 16 below a predetermined maximum.

The improved safety seal 40 comprises a tube 41 closed at its lower end, as at 43, to provide a receptacle or chamber 42 for mercury. This tube is open at its upper end and has an internal diameter slightly larger than the diameter of the tube 28 which projects downward into the chamber 42 to a point adjacent to, but spaced from the bottom wall 43 thereof. Accordingly, if a quantity of mercury is placed in the chamber 42 as will reach the level indicated by the dotted line 44, it will provide a seal to prevent the escape of gas from the tube 28. The amount of mercury used is controlled by the maximum pressure desired to be maintained by the seal. When such pressure is exceeded the gas will force or blow mercury out of the tube 28 and the chamber 42, thereby permitting the escape of gas upwardly between the tubes 41 and 28 until the pressure is decreased.

The pressure of the escaping gas generally forces at least part of the mercury out of the chamber 42. In the present invention this mercury is gathered in an upwardly facing channel 45 which encircles the tube 41 adjacent its upper end and forms a collecting chamber 46. As illustrated in the drawings, this channel is formed by an annular flange 47 which projects outwardly from the tube 41, adjacent to, but spaced below the upper end thereof. The flange 47 terminates in an upwardly extending annular lip 48 forming the outer wall of the channel 45. The lip 48 projects above the upper end of the tube 41 a distance such as will ordinarily insure the retaining of the mercury in the seal receptacle.

The portion of the tube 41 which extends above the bottom wall 47 of the chamber 46 provides a retaining wall 49 between the chambers 42 and 46. This wall is provided with a pair of vertically extending slots 50 which provide restricting passageways through which mercury in the chamber 46 may return to the chamber 42. To facilitate complete drainage of the chamber 46 the lower wall 47 thereof slopes toward the slots 50 and the bottom walls of such slots form continuations of the bottom wall of the chamber 46.

When, in operation, the pressure in the service line or regulator rises above the predetermined maximum, mercury will be blown out of the chamber 42 over the retaining wall 49 and will fall into the surrounding chamber 46. The mercury in the chamber 46 tends to return to the chamber 42, but is retained in the chamber 46 by the force of gas exhausting upward through the relative narrow passageway between the outer wall of inner tube 28 or 28A and the inner wall of the chamber 42 past the slots 50. When the pressure in the service line decreases to the predetermined maximum the mercury returning from the chamber 46 to the chamber 42 remains there reestablishing the seal.

The seal 40 is provided with an external annular flange 52 having ears 53 through which bolts 54 may pass to facilitate attachment of the seal to the pressure regulator of Fig. 1 or to the body 60 of Figs. 2 and 3.

The body 60 is used when the seal is positioned at a point remote from the pressure regulator. This body is provided with a pair of chambers 61 and 62 which are separated by a wall 63. The chamber 61 provides a pressure chamber and has threaded openings 64 and 65 to receive inlet and outlet conduits 66 and 67 respectively. The wall 63 carries a downwardly projecting tube 28A which corresponds with the tube 28 of Fig. 1. The upper end of this tube is in communication with the pressure chamber 61 and the lower end passes through the exhaust chamber 62 and an opening 68 formed in the bottom wall thereof. The wall of the opening 68 is such as will receive the outer flange 48 of the seal 40 when the seal is secured in position, closing such opening by bolts 54. The walls of the chamber 62 slope downwardly toward the opening 68. Accordingly, should any of the mercury be discharged into the chamber 62 it will immediately flow into the channel 46 of the seal. The upper wall of the flange 48 of the seal is sloped or rounded downward and inward as at 69 to facilitate such flow. The top wall of the chamber 61 is provided with a threaded opening 70 to receive a conduit 71 which conveys the exhausting gas to a point of minimum hazard.

From the above description it will be seen that I have provided an extremely simple mercury seal device for use with either gas conduits or pressure regulators, and which seal will be highly efficient over long periods of time.

I claim:

A fluid safety seal for gas pressure regulators having an open ended pressure conduit projecting downwardly therefrom, said seal comprising a one piece member comprising a tube closed at its bottom by an integrally formed bottom wall and adapted to receive a sealing fluid into which the pressure conduit of the regulator projects with the inner wall of the tube spaced from the outer wall of the conduit, said tube having an integrally formed outwardly extending flange intermediate its ends, said flange terminating in an integrally formed upwardly extending annular wall rising above and encircling said tube thereby forming an integral encircling receptacle to receive sealing fluid spilling over said tube, the upper end of said tube being provided with vertically extending slots forming restricted passageways between said channel and said tube, said receptacle including an integrally formed bottom wall sloping from the outside inward and downward toward said tube and sloping from points midway between the slots downward toward said slots, said slots each having a bottom wall sloping downward and inward and forming a continuation of the bottom wall of said receptacle whereby all of the fluid overflowing said tube will return thereto through said slots.

GEORGE C. HUGHES.

REFERENCES CITED

The following references are of record in the file of this patent:

UNITED STATES PATENTS

| Number | Name | Date |
| --- | --- | --- |
| 1,865,870 | MacLean | July 5, 1932 |